Oct. 27, 1964   M. L. PERL ETAL   3,154,687
OPTICAL FEEDBACK IMAGE INTENSIFYING SYSTEM
Filed Aug. 10, 1960   3 Sheets-Sheet 1

INVENTOR.
MARTIN L. PERL
LAWRENCE W. JONES
BY A. Shrogo

Oct. 27, 1964    M. L. PERL ETAL    3,154,687
OPTICAL FEEDBACK IMAGE INTENSIFYING SYSTEM
Filed Aug. 10, 1960    3 Sheets-Sheet 3

INVENTOR.
MARTIN L. PERL
LAWRENCE W. JONES
BY

United States Patent Office 3,154,687
Patented Oct. 27, 1964

3,154,687
OPTICAL FEEDBACK IMAGE INTENSIFYING SYSTEM
Martin L. Perl and Lawrence W. Jones, Ann Arbor, Mich., assignors, by mesne assignments, to the United States of America as represented by the Secretary of the Navy
Filed Aug. 10, 1960, Ser. No. 48,791
11 Claims. (Cl. 250—213)

The present invention relates generally to electro-optical systems and, more particularly, to apparatus for and methods of increasing the brightness of optical images while preserving their pictorial integrity.

The need for a "light amplifier" having a quantum gain in the order of $10^4$ to $10^8$ is well recognized. An amplifier with such characteristics could be utilized in such areas as military surveillance, area protection, navigation and transportation systems where the objects to be detected may be illuminated only by starlight, moonlight or by infrared radiation. In medical radiology, where the X-ray level is in part dependent upon the threshold of sensitivity of the recording apparatus, this amplifier could permit the intensity of the X rays to be greatly reduced, an achievement which would safeguard both patient and attendant medical personnel. In the allied field of radiological testing of materials thicker castings could be X-rayed with the same level of exposure and here, too, there would be less need for complicated radiation protecting equipment to safeguard operating personnel.

In the field of high energy nuclear physics, such an image intensifier would find productive application as, for example, one of the components of a luminescent chamber for photographically recording the visible light patterns produced by the motion of charged atomic and subatomic particles through various media. Many other research uses of such an image intensifier are obvious, such as, for example, in connection with astronomic and oceanographic observations, upper atmosphere research, reconnaissance satellites, the study of light emission from various surfaces and the investigation of relatively weak radiations from plants and animals. Also, if extremely short resolution times in the order of $10^{-8}$ seconds could be achieved, the amplifier could be used to study spark phenomena, gas discharges, conductions in shock tubes and the behavior of high temperature plasma.

Generally speaking, the prior art methods for accomplishing high image intensification are of three types. The most common of these is the well-known television system. The second type of amplifier relies upon the phenomena of photoelectric luminescence or a combination of photoconductivity and electroluminescence. The last class of light amplifiers depends upon image intensifier tubes having as components a photocathode which converts the optical image to an electron image, electrostatic or magnetic field systems for accelerating the emitted electrons while preserving their spatial relationship, and a fluorescent screen or mosaic which produces the final intensified optical image upon bombardment by the accelerated electrons.

The disadvantage of the television system as a means for obtaining image intensification is that in some of the applications alluded to hereinbefore the initial image is one thousand to ten thousand times too weak to be effectively detected by the pickup apparatus. Although large amplification can be realized with television equipment, the noise level of the pickup camera effectively precludes its employment where very weak signals are encountered. Furthermore, the size of its power supply cannot be tolerated in situations where space and weight are critical. As regards the semiconductor amplifier, this category of image intensifiers does not provide an acceptable solution in most cases because of their noise levels and slow response times, which time may be only in the order of one second.

The image intensifier, it would be noted, is a device for increasing the brightness of an optical image while preserving its pictorial quality. It differs from a photomultiplier which can increase the brightness of a light signal but cannot transmit an image. As mentioned hereinbefore, the amplification realized with such tubes comes about as a consequence of the acceleration of the electrons produced by the illumination of the photocathode; this amplification being a function of the electron energy and the efficiencies of the photocathode and the phosphor used in the fluorescent screen.

In order to reach amplification levels in the order of $10^4$ to $10^8$ with the prior art image converting and semiconductor amplifiers, it is necessary to cascade a multiplicity of individual units, since each stage has a maximum amplification factor of approximately one hundred for unity magnification. However, when image intensifying tubes are cascaded, a significant loss of light occurs in the external optical systems which transfer the images from tube to tube. Efforts to minimize this leakage by incorporating all of the stages within a single vacuum envelope have not been particularly successful since this consolidation is accompanied by a reduction in the amplification of each stage by a factor of as much as six. Hence, to reach the amplification range mentioned heretofore, anywhere from three to twelve tubes or stages are required.

It is accordingly a primary object of the present invention to provide a "light amplifier" having high gain characteristics.

Another object of the present invention is to provide an image intensifier having an amplification factor in the order of $10^4$ to $10^8$.

Another object of the present invention is to provide an image intensifier having a resolution time in the order of $10^{-8}$ seconds.

Another object of the present invention is to provide an image intensifier capable of multiplying the brightness of very weak infrared, visible and ultraviolet light images up to $10^8$ times.

A still further object of the present invention is to achieve high amplification of optical images and the like by means of regenerative principles.

A yet still further object of the present invention is to provide a regenerative type image intensifier capable of functioning with initial images involving ten or more photons.

A still further object of the present invention is to provide a regenerative image intensifier of the nonchanneled type.

A still further object of the present invention is to provide a nonchanneled regenerative image intensifier utilizing a pair of image tubes which have only moderate amplification factors.

A still further object of the present invention is to provide an image intensifier having an interim storage feature for eliminating the need of fine registry.

A still further object of the present invention is to provide a flip-flop feedback image intensifier wherein a pair of image tubes are alternately gated to obviate the need of fine registry in the system.

A yet still further object of the present invention is to provide an image intensifying system having an optical positive feedback loop which operates in a discontinuous fashion.

Other objects and many of the attendant advantages of this invention will be readily appreciated as the same becomes better understood by reference to the following detailed description when considered in connection with the accompanying drawings wherein.

Briefly and in general terms, the above objects of invention are accomplished by affiliating an optical feedback loop with either a two-stage image intensifying tube or a pair of single-stage tubes. This optical loop transports the image appearing on the fluorescent screen of the second tube or stage back to the photocathode of the first tube or stage after a time lapse calculated to insure the partial disappearance of the image previously formed on the fluorescent screen of the first stage. The above feedback is of a positive nature and results in an energy build-up in the system. The reason for imparting a time delay to the feedback is to avoid the problem of fine image registry, an aspect of the system which will be discussed more fully hereinafter.

Figure 1:
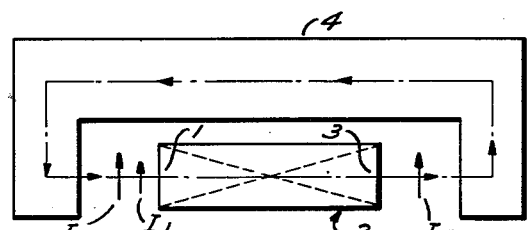
FIG. 1 illustrates the principle of optical feedback as used in light amplifying systems.

The use of optical feedback as a possible solution for achieving high amplification with image intensifying tubes has been considered in the past, but only from a theoretical standpoint under conditions of perfect registry of successive images and without the time delay feature mentioned above. Such a basic system can best be understood by referring to FIG. 1. Here, an initial image $I_1$ illuminates the photocathode 1 of a conventional image tube 2, and the resultant output image $I_2$ formed on the fluorescent screen 3 of this tube is transported via an optical channel 4 back to the photocathode. In the simplest case, the feedback image $I_3$ is superimposed on the initial image $I_1$. If G, the product of the tube's amplification A and the loop gain of the optical system F, is greater than 1, then image $I_2$ will increase in brightness with time, and this amplification process can continue until the tube must be turned off to prevent its destruction.

At this point, the difference between a channeled and a nonchanneled regenerative image intensifying system might be explained, since an understanding of this difference is a prerequisite for an appreciation of the importance of the registry problem solved by the present invention. As is well known, it is possible to increase the brightness of an optical image by disecting it into discrete, elemental areas so that each area has but a single parameter, namely, its light intensity, and thereafter subjecting each light signal to equal amounts of amplification. This is the principle used in television. One method of carrying this concept into practice involves assembling a bundle of light transmitting rods, disposing these rods against the image whereby finite portions thereof are sensed by each rod, independently amplifying each signal so detected by conventional means and then recombining the individual signals into a final image by a light projection scheme. Because of the physical limitations imposed upon the size of the light rods, this arrangement does not give faithful image reproduction.

An image intensifying system is nonchanneled, according to the present description, when either the electron image in the amplifying element, the optical image in the feedback element, or both, are not disected. That is, either or both of these images are focused and transported as a whole.

In all nonchanneled systems, there is, of course, first the fundamental requirement of gross registry, that is, all the image inversions produced by the image tubes must be canceled out so that successive images appearing in the system have the same spatial orientation. With electrostatically focused image tubes, an image inversion takes place in each stage and, consequently, depending upon the exact number of stages involved, special image inverting equipment may need to be included in the optical train. However, once gross registry has been satisfied, the question of fine registry must be considered. Without going into a mathematical analysis, it can be stated that for fine registry successive images must coincide within one millimeter on the average. Such a requirement can be met by the optical feedback portion of the system. But most electrostatic image tubes have a pincushion distortion which prevents this precise image superimpositioning. Although this distortion can be compensated to some extend by inserting an equivalent barrel distortion into the optical train or by placing an optical member having an aspheric surface against the screen, these corrective measures must be made on a trial and error basis and are usually not completely successful. It will be appreciated that in systems lacking fine registry, there is a degradation of successive images which puts a definite limit on the number of cycles of image feedback which can be performed. This factor determines the upper level of image amplification.

One way of eliminating the need of fine registry would be to insert a time delay into the optical loop which would prevent the application of the feedback image to the photocathode until the output image had faded from the fluorescent screen. Stated somewhat differently, if the phosphor decay time is approximately sixty to eighty microseconds, a time delay of this magnitude in the optical train would permit feedback image to be placed anywhere within reason on the photocathode, since the first output image would have disappeared by this time. However, no feasible method of introducing a delay much greater than the phosphor decay time, which is in the order of $10^{-4}$ seconds, has been so far available.

According to one preferred embodiment of the present invention, such a delay is realized by a flip-flop regeneration process confined to the image conversion portion of the system. In carrying out this mode of operation, two sequential image conversions are performed by means of either a two-stage tube or two single-stage tubes in series. Initially, the first stage upon which the original image is applied is triggered "on" and the second stage is maintained "off". After a predetermined time which is related to the phosphor decay time, the first stage is switched off and the second stage switched on, and the foregoing sequence is repeated a preselected number of times.

Thus, each stage is gated so that after the appearance of the initial image the light signal for the "on" stage comes from energy stored in the phosphor of the "off" stage. Consider now, the conditions obtaining at, for example, the photocathode of the "off" stage. Since this stage is inoperative, the position of the image derived from the screen of the second stage illuminating it at this time is of no significance. However, when this photocathode is switched on, the previous image on the screen of this stage has disappeared so that there is no spatial conflict when the image produced by this photocathode appears. This new image does not interfere with the image still persisting on the screen of the second stage which is now off, since the latter's photocathode is now inoperative. At the end of a predetermined number of cycles, the second stage may be left on for viewing purposes and the first stage turned off completely.

Figure 2:
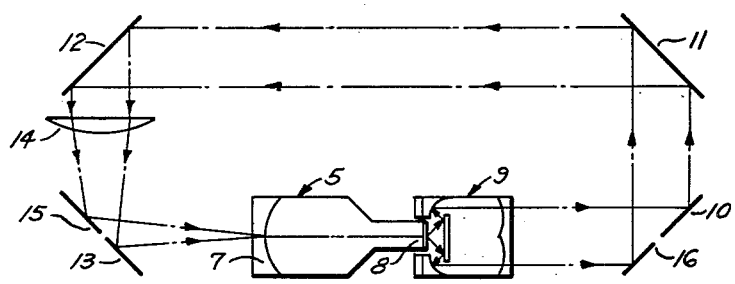
FIG. 2 shows an image intensifying system employing a single tube.

FIG. 2 illustrates a regenerative image intensifying system in which the electronic and optical portions thereof are so free of distortion and so well aligned that successive images appearing within the system are superimposed within the limits previously mentioned. In this embodiment, the intial image is focused on the photocathode 7 of an image tube 5 by any well known optical arrangement, one of which will be disclosed hereinafter. The intensified image produced on the screen 8 is collected by Schmidt lens system 9, which is preferably focused close to infinity to give a greatly magnified image of the tube screen. After traversing the Schmidt system, the magnified image strikes in sequence the reflecting surfaces of a first, second, third and fourth planar mirror. These mirrors 10, 11, 12 and 13 are so arranged and symmetrically disposed that a closed optical loop is formed which returns the original image in brighter form back to the photocathode 7. A plastic Fresnel lens 14, which is inserted between mirrors 12 and 13 to counteract the Schmidt assembly, demagnifies the image and permits its focusing on the photocathode. Finite apertures 15 and 16 can be provided in the central portions of mirrors 13 and 10, respectively, to allow the introduction of the initial image into the system and the viewing of the final output image. Because tube 6 is on continuously, light noises also build up and the entire field of view of the screen will become extremely bright with or without an original image being present. Thus, for safety's sake, the optical light path must be quickly interrupted, and this can be done by inserting an opaque screen anywhere in the system.

With present tubes and lenses, it is very difficult to achieve the fine registry necessary for the successful operation of the system of FIG. 2. Consequently, this arrangement at present has little practical value, and its inclusion in the disclosure is mainly for the purpose of illustrating the general cooperation between a conventional image intensifying tube and a simplified optical feedback loop.

Figure 3:
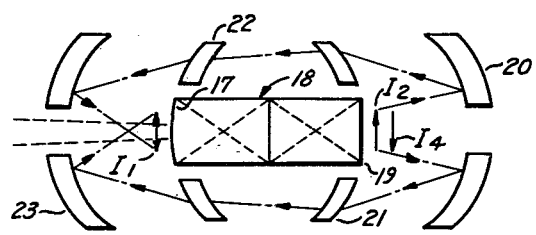
FIG. 3 illustrates the basic optical geometry of a two-stage image intensifier.

The basic geometry of a nonregistry, nonchanneled image intensifier which can be used in the present invention is depicted, in part, in FIG. 3. The operation of this apparatus is as follows. The initial image $I_1$ enters through an aperture in a front curved mirror 16 and illuminates the first photocathode 17 of a two-stage image intensifying tube 18. The amplified image $I_2$ on the last screen 19 is focused by a back curved mirror 20 and directed through optical correctors 21 and 22 to the reflecting side of mirror 23 which returns it back onto the first photocathode 17. This image, in turn, experiences a second amplification by the tube, and a new, intensified image $I_4$ appears on screen 19.

In this particular case, $I_4$ need not be superimposed or finely registered on $I_2$ since, as will be explained hereinafter, the two-stage tube is gated so that, in effect, $I_2$ has substantially decayed before $I_4$ appears. It is this time lapse provision which eliminates the stringent requirement of fine registry, a condition which has heretofore limited the use of optical regenerative systems.

Figure 4:
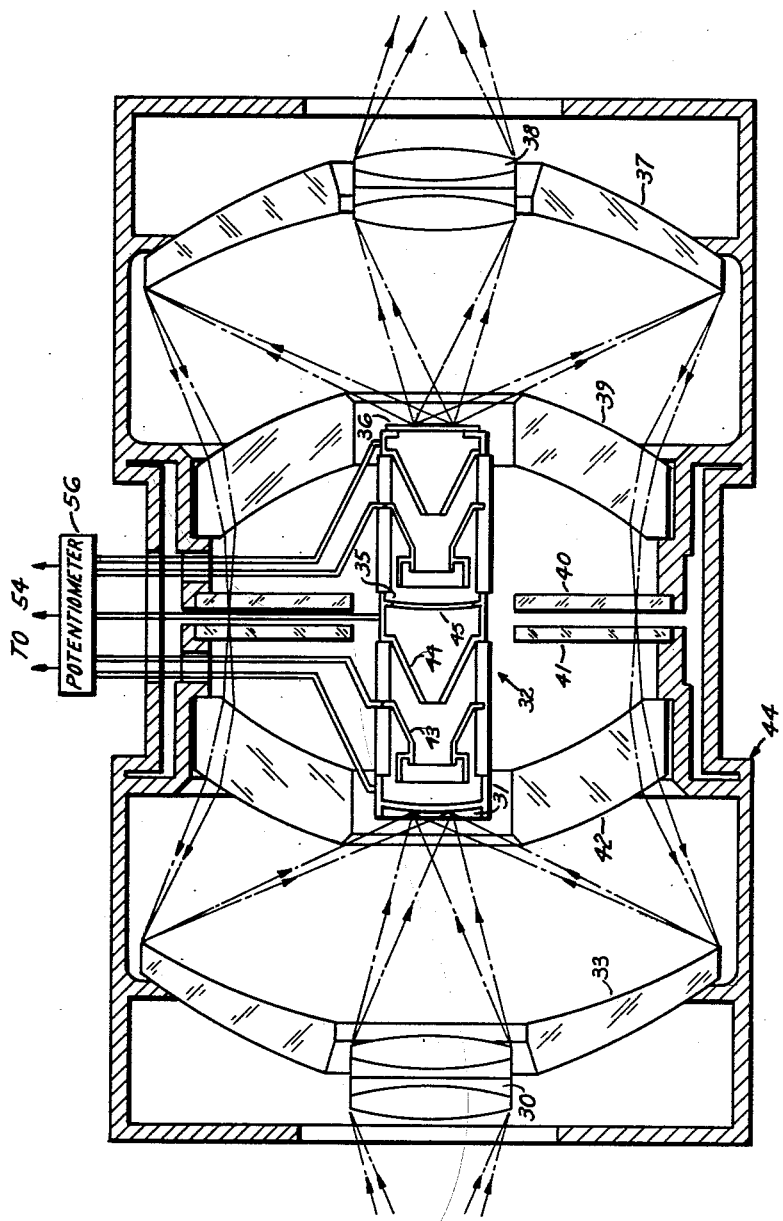
FIG. 4 illustrates the structural details of the components of FIG. 3.

The structural details of the apparatus schematically depicted in FIG. 3 are shown in FIG. 4. In this configuration, the initial image is focused by a pair of achromats 30 onto the photocathode 31 of a two-stage tube 32. These lenses fit into a central aperture formed in a front spherical mirror 33. As is well known, when the optical image illuminates photocathode 31, a corresponding pattern of electrons is released. These electrons are focused by an electrostatic field produced by grid 43 and accelerated by a potential applied to anode 44. When these electrodes strike fluorescent screen 45, they produce an intensified optical image which illuminates a second photocathode 35. This second image, in turn, experiences further amplification in the second stage as a result of a repetition of the above sequence, and the output image appears on second screen 36. This image is reflected by a rear spherical mirror 37 which accommodates a pair of achromats 38 similar to those housed within the central portion of mirror 33. Thereafter, the image is sent through a rear, spherical corrector 39, a rear aspherical corrector 40, a front aspherical corrector 41, and a front spherical corrector 42 to the reflecting surface of mirror 33 which focuses it on the photocathode 31. This combination of components is maintained in proper alignment by an aluminum housing 44. The paths of the extreme light rays are shown to indicate the optical sequence above described. The final output image is removed by achromats 38 which focus it on any exterior recording apparatus, such as, for example, the photographic plate of an ordinary camera.

Figure 5:
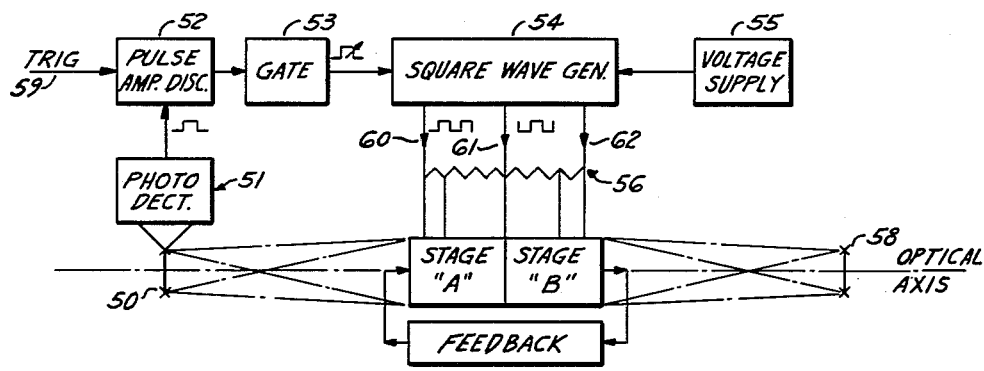
FIG. 5 is a block diagram of a two-stage image intensifying system constructed according to the present invention.

FIG. 5 is a block diagram of the electronic control circuits for sequentially gating the two-stage image tube to bring about the discontinuous feedback. The amplification process is initiated by the appearance of the original image 50, and its detection by a photoresponsive detector 51. This detector transmits a pulse to discriminator 52 which, in turn, supplies an input pulse to a gate 53 which controls the activation of a square wave generator 54 energized from voltage source 55. The output of the square wave generator is coupled to a resistance network 56 to which are attached at various points the control eletcrodes of the two-stage image tube 56.

Square wave generator 53 may take the form of a multivibrator, and its period can be regulated in accordance with the decay time of the phosphors utilized in the screens of the image tube by adjustments made to the time constant of its RC circuits. The number of feedback cycles experienced by the image is determined by the duration of the pulse supplied by gate 53 to the square wave generator. In other words, gate 53 serves to turn the square wave generator on for a time interval governed by the amplification factor of each tube and the efficiency of the feedback loop. In order to give the system a somewhat greater flexibility, an external trigger pulse 58 can be coupled to the pulse discriminator 52 to institute a cycle of amplification whenever desired. In one physical embodiment of the present invention utilizing an R.C.A. two-stage image tube No. C73458, the stages were turned on and off by applying approximately ten to fifteen thousand volts across lines 60, 61 and 61, 62, and gate 53 was controlled to permit generator 54 to carry out twenty cycles of switching.

The system of FIG. 5, as mentioned hereinbefore, operates with sequential gating of the two stages and with each stage on for a time $u$ as follows:

Stage A on, Stage B off—$0-u$, $2u-3u$ . . . $(2c-2)u-(2c-1)u$

Stage A off, Stage B on—$u-2u$, $3u-4u$ . . . $(2c-1)u-(2c)u$

Consequently, at no time are both stages on simultaneously, and the signal progresses around the loop in a discontinuous fashion. After each gating cycle, a new image appears on the fluorescent screen of stage B. The image appearing during the first gating cycle is called $L_{B1}$. The image appearing during the second gating cycle is called $L_{B2}$ and so forth. Then, if there are C gating cycles, only images $L_{B1}$, $L_{B2}$, $L_{B3}$ . . . $L_{BC}$ will appear. In other words, $L_{Bn}=0$ for $n>c$. Thus, the problem of an infinite series of images is avoided and there is a last and, in fact, brightest image. The question now remains of how much the loop gain G is reduced with such a mode of operation. This gain, of course, is lowered because when, for example, stage A is on and stage B off the photons being emitted from the phosphors of stage B are being amplified and stored in the phosphors of stage A. But the photons being emitted from the phosphors of stage A during this time are lost permanently. Hence, during half a cycle, a phosphor may receive a signal but the signal it emits is wasted. Whereas, during the next half cycle the phosphor receives no signal but the signal it emits is used. There is also the second question of whether images $L_{bn-2}$ and $L_{Bn-1}$ are sufficiently less bright than $L_{Bn}$ to be discriminated against by a recording element such as a photographic film.

Figure 6:
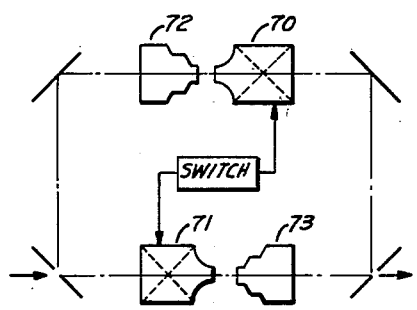
FIG. 6 illustrates a simple two-tube image regenerating system.
Figure 7:
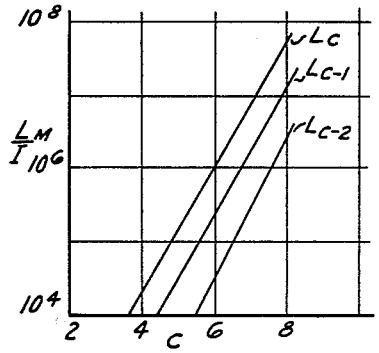
FIG. 7 is a graph illustrating the characteristics of the system of FIG. 6.

In the following mathematical analysis, a system such as the one shown in FIG. 6, having two separate image tubes 70, 71 with companion large aperture refractive lenses 72 and 73, will be considered. This configuration gives a more symmetrical analysis, but the analysis of the two-stage single tube system is almost completely identical. In the following calculations, both tubes have the same phosphor decay time and $u$ is in units of that time. The approximation is used that this decay time can be represented by a purely exponential function with a fixed decay time. As for the other symbols used, $g^2=G$, the total loop gain of the system, $a$ is the amplification of a single tube, $I$ is the number of photons which are instantaneously placed on the photocathode of the first tube, $t$ is general time, not the time during which the system is operated, and $L_{Ai}$ and $L_{Bi}$ refer to the total output signal of the $i$th image on phosphors A, B respectively.

For time $0-u$ with A on, B off:

(1) $$\frac{dL_{A_1}}{dt}=Iae^{-t} \qquad \frac{dL_{B_1}}{dt}=0$$

It will be understood that all other signals are zero and that all signals not hereinafter explicitly given are also zero.

For time $u-2u$, A off, B on:

(2) $$\frac{dL_{A_1}}{dt}=Iae^{-t} \qquad \frac{dL_{B_1}}{dt}=Iag(t-u)e^{-t}$$

For time $2u-3u$, A on, B off:

(3) $$\frac{dL_{A_1}}{dt}=Iae^{-t} \qquad \frac{dL_{B_{11}}}{dt}=Iague^{-t}$$

(4) $$\frac{dL_{A_2}}{dt}=Iag^2u(t-2u)e^{-t}$$

For time $3u-4u$, A off, B on:

(5) $$\frac{dL_{A_1}}{dt}=Iae^{-t} \qquad \frac{dL_{B_1}}{dt}=Iage^{-t}[u+(t-3u)]$$

(6) $$\frac{dL_{A_2}}{dt}=Iag^2u^2e^{-t} \qquad \frac{dL_{B_2}}{dt}=Iag^3e^{-t}u^2(t-3u)$$

For time $(2c-1)u$ to $2cu$, A off, B on:

(7) $$\frac{dL_{A_1}}{dt}=Iae^{-t} \qquad \frac{dL_{B_1}}{dt}=Iage^{-t}[(c-1)u+t-(2c-)u]$$

(8) $$\frac{dL_{Bc}}{dt}=Iag^{2c-1}e^{-t}u^{2c-2}[t-(2c-1)u]$$

Thus, in $c$ cycles $L_{BC}$ has received a signal once from $L_{BC-1}$, $L_{BC-1}$ has received a signal twice from $L_{BC-2}$, and so forth; and $L_{B1}$ has received a signal $c$ times from I. The hum of all these signals will be added up, since in practice the recording apparatus will usually be operating from time zero to a time very much greater than the phosphor decay time. Now, replacing $g^2$ with G and writing $L_{Bn}$ as $L_n$, the total signals are (9) $$L_n=0 \quad n>c$$

(10) $$L_c=\frac{I_a}{\sqrt{G}}\left[\frac{Gu^2}{e^{2u}}\right]^c\left[\frac{e^u-1}{u^2}\right]$$

(11) $$L_{c-1}=\frac{I_a}{\sqrt{G}}\left[\frac{Gu^2}{e^{2u}}\right]^{c-1}\left[\frac{e^u-1}{u^2}\right][1+(2c-3)e^{-2u}]$$

(12) $$L_{c-2}=\frac{I_a}{\sqrt{G}}\left[\frac{Gu^2}{e^{2u}}\right]^{c-2}\left[\frac{e^u-1}{u^2}\right]\left[1+(2c-5)e^{-2u}+\frac{(2c-4)(2c-5)}{2}e^{-4u}\right]$$

(13) $$\vdots$$

$$L_1=\frac{I_a}{\sqrt{G}}\left[\frac{Gu^2}{e^{2u}}\right]\left[\frac{e^u-1}{u^2}\right][1+e^{-2u}+e^{-4u}+\ldots+e^{-2(c-1)u}]$$

The maximum value of $L_c$ occurs when $u$ is approximately 1, that is, when the half period is equal to the phosphor decay time. In this maximized case, the previous expressions become:

(14) $$L_n=0 \quad n>c$$

(15) $$L_c=1.72\frac{I_a}{\sqrt{G}}\left[\frac{G}{e^2}\right]^c$$

(16) $$L_{c-1}=1.72\frac{I_a}{\sqrt{G}}\left[\frac{G}{e^2}\right]^{c-1}\left[1+\frac{2c-3}{e^2}\right]$$

(17) $$L_{c-2}=1.72\frac{I_a}{\sqrt{G}}\left[\frac{G}{e^2}\right]^{c-2}\left[1+\frac{2c-5}{e^2}+\frac{(2c-4)(2c-5)}{2e^4}\right]$$

$$\vdots$$

(18) $$L_1=1.72\frac{I_a}{\sqrt{G}}\left[\frac{G}{e^2}\right][1+e^{-2}+e^{-4}+\ldots+e^{-2(c-1)}]$$

(19) $L_1=0.27I_a[1-e^{-2c}]\sqrt{G}$

Now, considering $L_c$, it will be seen that the gross effect of the alternating gating is to reduce $a$ and $\sqrt{G}$ by a factor of $e$. Thus

(20) $$L_c/I=1.72\frac{a\sqrt{G}}{e^2}\left[\frac{G}{e^2}\right]^{c-1}$$

The equations for the case of a single two-stage image tube are only slightly different and involve replacing $I_a/\sqrt{G}$ by $IA/G$. Thus, $L_c$, $L_{c-1}$, and so forth, the output signals on the screen of the second stage, are

(21) $$L_n=0 \quad n>c$$

(22) $$L_c=1.72\frac{IA}{G}\left[\frac{G}{e^2}\right]^c$$

(23) $$L_{c-1}=1.72\frac{IA}{G}\left[\frac{G}{e^2}\right]^{c-1}\left[1+\frac{2c-3}{e^2}\right]$$

In order to determine whether or not the various images can be separated on the basis of their relative intensities, a comparison of representative images can be made. Thus,

(24) $$L_c/L_{c-1}=\frac{G}{e^2+2c-3}$$

(25) $$L_c/L_{c-2}=\frac{G^2}{e^2+2c+5+\frac{(2c-4)(2c-5)}{2e^2}}$$

In the reasonable case where $c=6$, $G=50$ and $A=300$, which gives a total gain of $10^6$, $L_c/L_{c-1}=3.1$ and $L_c/L_{c-2}=130$. Thus, the $L_{c-2}$ image will not be visible and $L_{c-1}$ image will probably be visible. Consequently, it is relatively easy to separate these images from $L_c$.

If very large values of $c$ are used in the flip-flop system, several images of commensurate intensity will be produced. But as shown in FIG. 6, which is a logarithmic graph of $L/I$ vs. $c$ for the case where $A=300$, $G=50$ and $u=1$, this does not occur and, in effect, this graph represents the practical range of parameters for the system.

Figure 8:
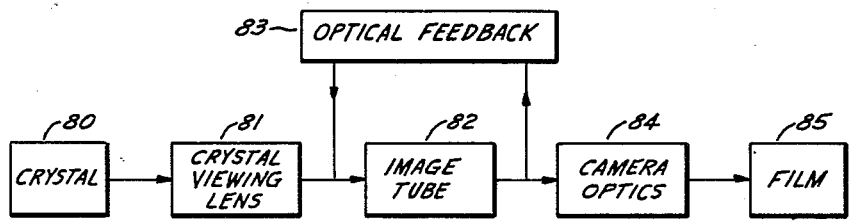
FIG. 8 is a block diagram of a luminescent chamber system utilizing a light amplifier constructed in accordance with the present invention.

In FIG. 8 there is shown in block diagram a luminescent chamber system utilizing the optically regenerative image amplification technique above described. The apparatus consists of a scintillating crystal 80, a crystal viewing lens 81, a two-stage image tube 82 having a feedback loop 83, the optical components of a conventional camera 84 and a strip of recording film 85. It would be pointed out in connection with the above system that, unlike the cascaded image intensifier, the camera's optical properties do not limit the efficiency of the feedback path.

Obviously many modifications and variations of the present invention are possible in the light of the above teachings. It is therefore to be understood that within the scope of the appended claims the invention may be practiced otherwise than as specifically described.

What is claimed is:

1. An image intensifying system comprising, in combination, an image intensifying stage, said stage including at least a photosensitive cathode and an electroluminescent screen, means for initially focusing an input image on said photosensitive cathode whereby a corresponding brighter image appears on said electroluminescent screen, means for turning said image intensifying stage on and off a given number of times, with each "off" period being approximately equal to the decay time of the light producing material of said electroluminescent screen, and means for illuminating said photosensitive cathode with an image derived from each brighter image at the start of each "on" period of said image intensifying stage.

2. An image intensifying system comprising, in combination, an image intensifying stage, said stage including at least a photosensitive cathode and a fluoroescent screen, means for initially illuminating the photosensitive cathode of said stage with an input image whereby an intensified reproduction thereof is formed at said fluorescent screen, means for turning said stage "on" and "off" after said initial illumination, said "off" period being approximately equal to decay time of the light producing substance of said fluorescent screen, means for preserving each image formed at said fluorescent screen during the "off" period of said stage and means for illuminating said photosensitive cathode with each preserved image during the "on" period of said stage whereby an image of increasing brightness appears on said fluorescent screen.

3. An image intensifying system comprising, in combination, an image intensifying tube, said tube having at least a photosensitive cathode and an electroluminescent screen, means for initially illuminating said photosensitive cathode with an input image whereby an output image of increased intensity is produced at said fluorescent screen, means for repeatedly turning said first tube "on" and "off" for a given number of times after said initial illumination with the "off" periods being approximately equal to the decay time of the light producing substance of said electroluminescent screen, means for storing the output image produced at said electroluminescent screen for a period of time equal to said "off" period and means for directing each stored output image back upon said photosensitive cathode, thereby to achieve further intensification of each output image during successive "on" periods of said image intensifying tube.

4. An image intensifying system comprising, in combination, an image intensifying stage, said stage including at least a photosensitive cathode and an electroluminescent screen, means for initially illuminating said photosensitive cathode with an input image, means for turning said stage on and off repeatedly for a given number of times after said initial illumination with each "off" period being substantially equal to the decay time of the light producing substance of said fluorescent screen, means for feeding back each intensified image formed at said fluoroescent screen upon said photosensitive cathode, said means including an image storage element whereby each intensified image appears upon said photosensitive cathode after the intensified image previously formed at said fluorescent screen has substantially disappeared whereby there is no conflict between successive images formed at said fluorescent screen.

5. An image intensification system comprising, in combination, first and second image intensifying tubes, each tube including at least a photosensitive cathode and an electroluminescent screen, said tubes being disposed such that the photosensitive cathode of said second tube is illuminated by energy radiated from the electroluminescent screen of said first tube, means for initially illuminating the photosensitive cathode of said first tube with an input image, means for thereafter repeatedly turning said first and second tubes "on" during alternate equal periods, said periods being approximately equal to the decay time of the light producing substance of said electroluminescent screen, and an optical feedback path for directing the image produced on the electroluminescent screen of said second tube back upon the photosensitive cathode of said first tube.

6. An image intensifying system comprising, in combination, first and second image intensifying tubes, each tube including at least a photosensitive cathode and an electroluminescent screen, means for cascading said tubes such that the photosensitive cathode of said second tube is illuminated with the radiation produced by the electroluminescent screen of said first stage in response to electron excitation thereof, means for illuminating the photosensitive cathode of said first stage with the image that is to be amplified, an optical feedback path for transporting the image produced at the electroluminescent screen of said second tube back upon the photosensitive cathode of said first tube, means for activating said first and second tubes sequentially a given number of times for time intervals approximately equal to the decay time of the radiation producing substance of said electroluminescent screens whereby increasingly brighter images are produced on each screen with no interference between successive images.

7. An image intensifying system comprising, in combination, first and second image intensifying tubes, each tube including at least a photosensitive cathode and an electroluminescent screen, said tubes being disposed such that the photosensitive cathode of said second tube is illuminated by energy radiated from the electroluminescent screen of said first tube, means for initially illuminating the photosensitive cathode of said first tube with an input image, an optical feedback path for transporting the image produced at the electroluminescent screen of said second tube back upon said photosensitive cathode of said first tube, means for controlling said first and second tubes such that said first tube is on for a given period of time, then off for an equal period of time, and said second tube is off during the "on" period of said first tube and on during the "off" period of said first tube, said "on" and "off" periods being substantially equal to the decay time of the substance of said electroluminescent screen which radiates energy in response to electron excitation thereof, and means for turning said first tube off completely after it has been turning on and off a given number of times.

8. An image intensifying system comprising, in combination, a first and second image intensifying stage, each stage including at least a photosensitive cathode and a fluorescent screen, said stages being mutually disposed such that the photosensitive cathode of said second stage is illuminated by the light radiated by the fluorescent screen of said first stage, means for initially focusing an input image on the photosensitive cathode of said first stage, an optical feedback path between the screen of said second stage and the photosensitive cathode of said first stage, and means operative with the appearance of said input image on the photosensitive cathode of said first stage for activating both stages during alternate equal periods, said periods being at least equal to the decay time of the light producing substance of said fluorescent screens, and means for permanently turning off said first stage after said first stage has been activated a predetermined number of times.

9. An image intensifying system comprising, in combination, a first image intensifying tube, said tube containing at least a photosensitive cathode and a fluorescent screen, means for initially focusing an input image on said photosensitive cathode, means for turning said intensifying tube on and off a given number of times with each "off" period being at least equal to the decay time of the light producing substance of said fluorescent screen, a feedback path between said screen and said photosensitive cathode for transporting the image produced on said fluorescent screen back to said photosensitive cathode for further amplification, an image storage device included in said path for introducing a time delay in said path which is substantially equal to the decay time of the light producing material of said fluorescent screen.

10. An image intensifying system comprising, in combination, a first image intensifying stage having at least a photosensitive cathode and a fluorescent screen, means for initially focusing an input image on said photosensitive cathode means for thereafter illuminating said photosensitive cathode with a succession of images each derived from the image produced on the fluorescent screen whereby increasingly brighter images appear on said screen, said last-mentioned means including a second image intensifying tube and an optical feedback path connected between the screen of said first tube and the photosensitive cathode of said first tube, and means for controlling the time at which each image of said succession of images illuminates the photosensitive cathode of said first stage so that there is no interference between the corresponding images which are developed at the fluorescent screen of said first tube.

11. An image intensifying system comprising, in combination, a first and second image intensifying stage, each stage including at least a photosensitive cathode and a fluorescent screen, said stages being disposed such that the photosensitive cathode of said second stage is illuminated by the light radiated from the fluorescent screen of said first stage, means for initially focusing an input image on the photosensitive cathode of said first stage, an optical feedback path between the screen of said second stage and the photosensitive cathode of said first stage, and means for turning said first stage on from time $t_1$–$t_2$, $t_3$–$t_4$, etc., and said second stage on from $t_2$–$t_3$, $t_4$–$t_5$, etc., where $t_1$ corresponds to the time at which said image is focused on said photosensitive cathode and where $t_1$–$t_2$, $t_2$–$t_3$ equals approximately the decay time of the light producing substance of said fluorescent screen and means for turning said first tube off at time $t_n$.

References Cited in the file of this patent
UNITED STATES PATENTS

| | | |
|---|---|---|
| 2,131,185 | Knoll | Sept. 27, 1938 |
| 2,240,844 | Goggin et al. | May 6, 1941 |
| 2,605,335 | Greenwood et al. | July 29, 1952 |
| 2,882,419 | Diemer et al. | Apr. 14, 1959 |
| 2,896,087 | Kazan | July 21, 1959 |
| 2,896,088 | Lempert | July 21, 1959 |
| 2,970,220 | Bouwers | Jan. 31, 1961 |
| 2,975,966 | Howard | Mar. 21, 1961 |
| 2,984,744 | Lynch et al. | May 16, 1961 |
| 3,030,514 | Salinger | Apr. 17, 1962 |